US007602430B1

(12) United States Patent
Merrill

(10) Patent No.: US 7,602,430 B1
(45) Date of Patent: Oct. 13, 2009

(54) HIGH-GAIN MULTICOLOR PIXEL SENSOR WITH RESET NOISE CANCELLATION

(75) Inventor: Richard B. Merrill, Woodside, CA (US)

(73) Assignee: Foveon, Inc., Santa Clara, CA (US)

( * ) Notice: Subject to any disclaimer, the term of this patent is extended or adjusted under 35 U.S.C. 154(b) by 348 days.

(21) Appl. No.: 11/736,932

(22) Filed: Apr. 18, 2007

(51) Int. Cl.
 *H04N 3/14* (2006.01)
(52) U.S. Cl. .................... 348/301; 348/241; 348/281; 348/302; 348/308
(58) Field of Classification Search ............ 348/241, 348/274, 280, 281, 294, 300, 301, 302, 306, 348/307, 308, 310, 362, 367; 250/208.1; 257/214, 229, 230, 231, 288, 291, 292; 357/513, 357/514
See application file for complete search history.

(56) References Cited

U.S. PATENT DOCUMENTS

| | | | |
|---|---|---|---|
| 3,971,065 A | 7/1976 | Bayer | |
| 4,011,016 A | 3/1977 | Layne et al. | |
| 4,238,760 A | 12/1980 | Carr | |
| 4,309,604 A | 1/1982 | Yoshikawa et al. | |
| 4,318,115 A | 3/1982 | Yoshikawa et al. | |
| 4,613,895 A | 9/1986 | Burkey et al. | |
| 4,651,001 A | 3/1987 | Harada et al. | |
| 4,677,289 A | 6/1987 | Nozaki et al. | |
| 4,772,335 A | 9/1988 | Huang | |
| 5,397,734 A | 3/1995 | Iguchi et al. | |
| 5,502,299 A | 3/1996 | Standley | |
| 5,608,243 A | 3/1997 | Chi et al. | |
| 5,668,596 A | 9/1997 | Vogel | |
| 5,739,562 A * | 4/1998 | Ackland et al. | 257/291 |

(Continued)

FOREIGN PATENT DOCUMENTS

EP 0 605 898 A1 7/1994

(Continued)

OTHER PUBLICATIONS

B.C. Burkey et al., "The Pinned Photodiode or an Interline-Transfer CCD Image Sensor," 1984 IEDM Tech Digest, p. 28-31, Dec. 1984, IEEE, N.Y., USA.

(Continued)

*Primary Examiner*—Nhan T Tran
*Assistant Examiner*—Chriss S Yoder, III
(74) *Attorney, Agent, or Firm*—Lewis and Roca LLP

(57) ABSTRACT

An active CMOS pixel sensor includes a red photodiode and a green photodiode coupled to sense nodes. Blue photodiodes are coupled to a blue sense node through select transistors. A blue reset transistor is coupled between a supply node and the blue sense node. A source-follower transistor is coupled to the blue sense node. A blue row-select transistor is coupled to the source-follower transistor and a biased blue column line. Red and green amplifier transistors have gates coupled to sense nodes, drains coupled to a supply node, and sources. Red and green reset transistors have drains coupled to the drains of the amplifier transistors, sources coupled to the sense nodes. Feedback capacitors couple the sense nodes to the reset transistor drains. Red and green row-select transistors have drains coupled to the sources of the amplifier transistors, sources coupled to biased column lines, and gates coupled to a red-green row-select line.

7 Claims, 3 Drawing Sheets

U.S. PATENT DOCUMENTS

| | | | |
|---|---|---|---|
| 5,872,371 | A | 2/1999 | Guidash et al. |
| 5,883,421 | A | 3/1999 | Ben Chouikha et al. |
| 5,889,315 | A | 3/1999 | Farrenkopf et al. |
| 5,899,714 | A | 5/1999 | Farrenkopt et al. |
| 5,900,623 | A * | 5/1999 | Tsang et al. ............. 250/208.1 |
| 5,949,061 | A | 9/1999 | Guidash et al. |
| 5,965,875 | A * | 10/1999 | Merrill ....................... 250/226 |
| 6,043,478 | A * | 3/2000 | Wang ....................... 250/208.1 |
| 6,066,510 | A | 5/2000 | Merrill |
| 6,078,037 | A | 6/2000 | Booth, Jr. |
| 6,111,300 | A | 8/2000 | Cao et al. |
| 6,150,683 | A * | 11/2000 | Merrill et al. ............... 257/292 |
| 6,410,899 | B1 | 6/2002 | Merrill et al. |
| 6,518,558 | B1 | 2/2003 | Bohm et al. |
| 6,727,521 | B2 | 4/2004 | Merrill |
| 6,731,397 | B1 | 5/2004 | Merrill et al. |
| 6,750,912 | B1 * | 6/2004 | Tennant et al. ............. 348/300 |
| 6,852,562 | B1 | 2/2005 | Hopper et al. |
| 6,960,757 | B2 | 11/2005 | Merrill et al. |
| 7,339,216 | B1 * | 3/2008 | Lyon et al. .................. 257/291 |
| 7,375,748 | B2 * | 5/2008 | Krymski ..................... 348/241 |
| 2002/0018131 | A1* | 2/2002 | Kochi ......................... 348/304 |
| 2002/0058353 | A1 | 5/2002 | Merrill |
| 2004/0169752 | A1* | 9/2004 | Stark .......................... 348/302 |
| 2004/0185597 | A1 | 9/2004 | Merrill et al. |
| 2005/0035927 | A1* | 2/2005 | Kimura ....................... 345/55 |
| 2005/0082461 | A1* | 4/2005 | Bock ....................... 250/208.1 |
| 2006/0017829 | A1* | 1/2006 | Gallagher ................... 348/276 |

FOREIGN PATENT DOCUMENTS

| | | |
|---|---|---|
| EP | 0 707 417 A2 | 4/1996 |
| EP | 0 707 417 A3 | 4/1996 |
| EP | 0 605 898 B1 | 4/1998 |
| JP | 61-187282 A1 | 8/1986 |
| JP | 01-134966 A1 | 5/1989 |
| WO | 98/19455 A1 | 5/1998 |

OTHER PUBLICATIONS

S. Chamberlain, "Photosensitivity and Scanning of Silicon Image Detector Arrays," IEEE Journal of Solid-State Circuits, vol. SC-4, No. 6, pp. 333-342, Dec. 1969, IEEE, N.Y., USA.

S. Chamberlain et al., "Technology Progress And Trends In Solid-State Silicon Image Sensors," IEEE 1985 Custom Integrated Circuits Conference, pp. 112-118, Rochester, New York, 1985, no month, IEEE, N.Y., USA.

M. Chouikka, "Color sensitive photodetectors in standard CMOS and BiCMOS technologies," SPIE, vol. 2950, pp. 108-118, Aug. 1996, Bellingham, WA, USA.

M. Chouikha, "Buried Triple p-n Junction Structure in a BiCMOS Technology for Color Detection," IEEE BCTM 6.4, pp. 108-111, Sep. 1997, IEEE, N.Y., USA.

P. B. Denyer et al., "CMOS Image Sensors For Multimedia Applications," IEEE 1993 Custom Integrated Circuits Conference, pp. 11.5.1 to 11.5.4, 1993, IEEE, N.Y., USA.

R. Guidash, "A 0.6 um CMOS Pinned Photodiode Color Imager Technology," IEDM, pp. 927-929, 1997, no month, IEEE, N.Y., USA.

D. Knipp et al, "Low Cost Approach to Realize Novel Detectors for Color Recognition," Proc. ICPS 98 (International Congress on Imaging Science), pp. 350-353, Sep. 1998.

J. Kramer, "Photo-ASICs: Integrated Optical Metrology Systems with Industrial CMOS Technology," Doctorial Dissertation: Diss Eth Nr. 10186. MSc Imperial College of Science and Technology, pp. 2-91, 1993.

H. Miura et al, "A 100 Frame/s CMOS Active Pixel Sensor for 3D-Gesture Recognition System," 1999 IEEE International Solid-State Circuits Conference, pp. 142-143, Jun. 1999, IEEE, N.Y., USA.

K. Parulski et al, "Enabling technologies for a family of digital cameras," SPIE, vol. 2654, pp. 156-163, 1996, no month.

P. Seitz et al., "Smart optical and image sensors fabricated with industrial CMOS/CCD semiconductor processes," SPIE, vol. 1900, pp. 21-30, Jul. 1993, Bellingham, WA, USA.

H. Stiebig et al., "Transient Behavior of Optimized nipiin Three-Color Detectors," IEEE Transactions on Electron Devices, vol. 45, No. 7, pp. 1438-1443, Jul. 1998, IEEE, N.Y., USA, N.Y., USA.

D. Sutherland, "Neaveau Niche-Part 1: The Latest in digital SLRs," Shutterbug, 5 pages, Nov. 1997, Titusville, FL, USA.

A. Theuwissen, "Fundamentals of Solid-State Imaging," Solid-State Imaging with Charge-coupled Devices, pp. 131-141, 1995 Reprinted with corrections 1996, 1997.

B. Weibel, "High-end digital cameras can make professional indoor photography a snap," Buyers Guide, 8 pages, Apr. 1997.

R. Wolffenbuttel et al., "A Novel Approach to Solid-State Colour Sensing," Sensors and Actuactors, vol. 9, pp. 199-211, 1986, no month.

R. Wolffenbuttel et al., "Performance of an Integrated Silicon Colour Sensors with a Digital Output in Terms of Response to Colours in the Colour Triangle," Sensor and Actuators, vol. A21-A23, pp. 574-580, 1990, no month.

H. Wong, "Technology and Device Scaling Considerations for CMOS Imagers", IEEE Transactions on Electron Devices, vol. 43, No. 12, pp. 2131-2142, Dec. 1996, IEEE, N.Y., USA.

* cited by examiner

HIGH-GAIN MULTICOLOR PIXEL SENSOR WITH RESET NOISE CANCELLATION

BACKGROUND OF THE INVENTION

1. Field of the Invention

The present invention relates to CMOS pixel sensors and to multicolor CMOS pixel sensors. More particularly, the present invention relates to a high-gain multicolor pixel sensor having reset noise cancellation.

2. The Prior Art

CMOS pixel sensors have become more prevalent in the art. Such pixel sensors typically employ a photodiode to collect charge and a select transistor and source-follower amplifier to read the charge out of the pixel sensor.

Multicolor versions of these pixel sensors are also known. Early examples of such sensors used an array of detectors formed in a pattern such as a Bayer pattern. Recently, vertical-color-filter CMOS pixel sensors have been disclosed, in which multiple pixel sensors (such as blue, green, and red) are positioned at different depths in a semiconductor body to take advantage of the fact that the penetration depth is a function of photon energy. Contact to the detectors disposed beneath the surface of the silicon body is made through deep contact structures.

BRIEF DESCRIPTION OF THE INVENTION

According to one aspect of the present invention, an active CMOS pixel sensor comprises a red photodiode, a green photodiode and a plurality of blue photodiodes. Each of the blue photodiodes coupled to a blue sense node through a different n-channel MOS blue-select transistor through a different blue-select line. An n-channel MOS blue reset transistor has a drain coupled to a supply node, a source coupled to the blue sense node, and a gate coupled to a reset control line. An n-channel MOS blue source-follower transistor has a gate coupled to the blue sense node, a drain coupled to a blue source-follower supply node, and a source. A blue row-select transistor has a drain coupled to the source of the blue source-follower transistor, a source coupled to a blue column output line and a gate coupled to a blue row-select line. A MOS capacitor is coupled to the blue sense node through a capacitor-select transistor having a gate coupled to a capacitor select line. The red photodiode is coupled to a red sense node. An n-channel MOS red amplifier transistor has a gate coupled to the red sense node, a drain, and a source. A p-channel MOS red amplifier transistor has a source coupled to a supply node, a drain coupled to the drain of the n-channel MOS red amplifier transistor, and a gate coupled to a reset1 control line. A n-channel MOS red reset transistor has a drain coupled to the drain of the n-channel MOS red reset transistor, a source coupled to the red sense node, and a gate coupled to a reset2 control line. A red feedback capacitor is coupled between the red sense node and the drain of the n-channel MOS red reset transistor. A red row-select transistor has a drain coupled to the source of the n-channel MOS red amplifier transistor, a source coupled to a red column output line and a gate coupled to a red-green row-select line. The green photodiode is coupled to a green sense node. An n-channel MOS green amplifier transistor has a gate coupled to the green sense node, a drain, and a source. A p-channel MOS green amplifier transistor has a source coupled to a supply node, a drain coupled to the drain of the n-channel MOS green amplifier transistor, and a gate coupled to the reset1 control line. A n-channel MOS green reset transistor has a drain coupled to the drain of the n-channel MOS green reset transistor, a source coupled to the green sense node, and a gate coupled to the reset2 control line. A green feedback capacitor is coupled between the green sense node and the drain of the n-channel MOS green reset transistor. A green row-select transistor has a drain coupled to the source of the n-channel MOS green amplifier transistor, a source coupled to a green column output line and a gate coupled to the red-green row-select line. The blue, red, and green column output lines are each coupled, respectively, to a blue, red, and green column-line bias transistor. The gate of the blue column-line bias transistor is coupled to a blue column line bias control line. The gates of the red and green column-line bias transistor are coupled to a R/G column line bias control line.

BRIEF DESCRIPTION OF THE DRAWING FIGURES

DETAILED DESCRIPTION OF THE INVENTION

Persons of ordinary skill in the art will realize that the following description of the present invention is illustrative only and not in any way limiting. Other embodiments of the invention will readily suggest themselves to such skilled persons.

Figure 1:
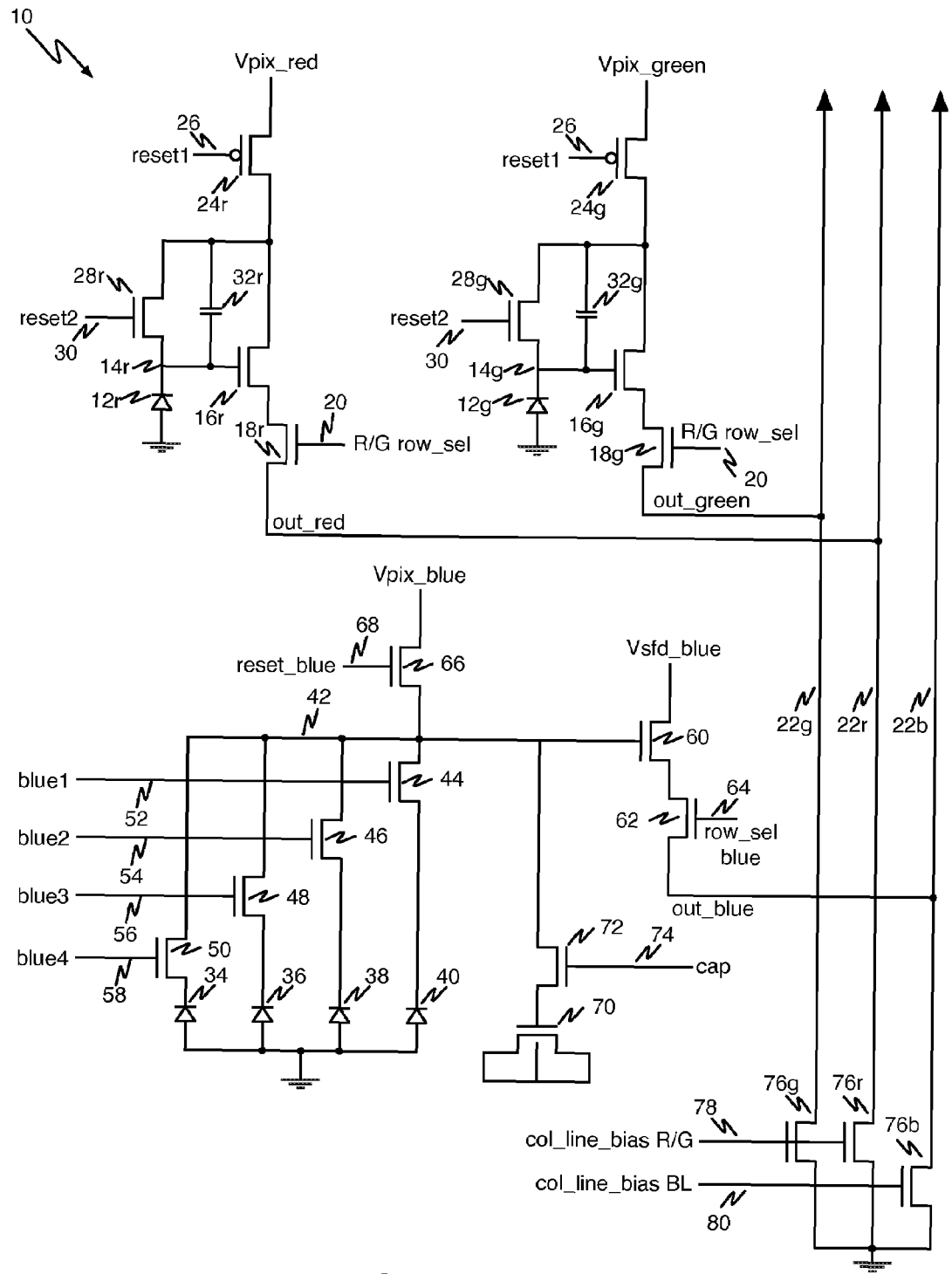
FIG. 1 is a schematic diagram of an illustrative multicolor CMOS active pixel sensor according to one aspect of the present invention.

Referring now to FIG. 1, a schematic diagram providing an example of such a pixel sensor 10 is shown. Pixel sensor 10 is configured so that the entire array can be reset at once. A pixel sensor of this type is usefully employed in an SLR-shutter type of pixel sensor array.

A red photodiode 12r is coupled to a sense node 14r comprising the gate of n-channel MOS amplifier transistor 16r. The source of n-channel MOS amplifier transistor 16r is coupled to the drain of an n-channel MOS row-select transistor 18r. The gate of n-channel MOS red row-select transistor 18r is coupled to R/G row-select line 20. The source of n-channel MOS red row-select transistor 18r is coupled to column output line 22r.

The drain of n-channel MOS amplifier transistor 16r is coupled to the drain of p-channel MOS amplifier transistor 24r. The source of p-channel MOS amplifier transistor 24r is coupled to supply potential $V_{pix\_red}$. The gate of p-channel MOS amplifier transistor 24r is coupled to a reset1 line 26.

An n-channel MOS reset transistor 28r is coupled between the gate of n-channel MOS amplifier transistor 16r and the common connection of the drain of p-channel MOS amplifier transistor 24r and the drain of n-channel MOS amplifier transistor 16r. The gate of n-channel MOS reset transistor 28r is coupled to a reset2 line 30. A capacitor 32r is coupled between the red sense node 14r and the common connection of the drain of n-channel MOS amplifier transistor 16r and the drain of p-channel MOS amplifier transistor 24r.

Similarly, a green photodiode 12g is coupled to a green sense node 14g comprising the gate of n-channel MOS amplifier transistor 16g. The source of n-channel MOS amplifier transistor 16g is coupled to the drain of an n-channel MOS row-select transistor 18g. The gate of n-channel MOS red row-select transistor 18g is coupled to R/G row-select line 20. The source of n-channel MOS red row-select transistor 78g is coupled to a column output line 22g.

The drain of n-channel MOS amplifier transistor 16g is coupled to the drain of p-channel MOS amplifier transistor 24g. The source of p-channel MOS amplifier transistor 84g is coupled to supply potential $V_{pix\_green}$. The gate of p-channel MOS amplifier transistor 24g is coupled to reset1 line 26.

An n-channel MOS reset transistor 28g is coupled between the gate of n-channel MOS amplifier transistor 16g and the common connection of the drain of p-channel MOS amplifier transistor 24g and the drain of n-channel MOS amplifier transistor 16g. The gate of n-channel MOS reset transistor 28g is coupled to reset2 line 30. A capacitor 32g is coupled between the sense node 14g and the common connection of the drain of n-channel MOS amplifier transistor 16g and the drain of p-channel MOS amplifier transistor 84g.

Blue photodiodes 34, 36, 38, and 40 are coupled to a blue sense node 42 through blue-select transistors 50, 48, 46, and 44, respectively. The gate of blue-select transistor 44 is coupled to a blue1 select line 52; the gate of blue-select transistor 106 is coupled to a blue1 select line 114; the gate of blue-select transistor 48 is coupled to a blue1 select line 56; and the gate of blue-select transistor 40 is coupled to a blue1 select line 58.

N-channel MOS amplifier transistor 60 has its gate coupled to blue sense node 42. The drain of n-channel MOS amplifier transistor 60 is coupled to supply potential $V_{sfd\_blue}$. The source of n-channel MOS amplifier transistor 60 is coupled to the drain of n-channel MOS blue row select transistor 62. The source of n-channel MOS blue row select transistor 62 is coupled to column output line 22b. The gate of n-channel MOS blue row select transistor 62 is coupled to blue row select line 64.

N-channel MOS reset transistor 66 has its source coupled to blue sense node 42 and its drain coupled to supply potential $V_{pix\_blue}$. Its gate is coupled to reset_blue line 68. Blue sense node 42 is also coupled to MOS capacitor 70 through n-channel MOS capacitor transistor 72. The gate of n-channel MOS capacitor transistor 72 is coupled to capacitor line 74.

The red, green, and blue column output lines 22r, 22g, and 82b are each coupled to the drain of a respective n-channel MOS column output load transistor 76r, 76g, and 76b. The gates of n-channel MOS column output load transistors 76r and 76g, are coupled together to a column_bias line R/G 78. The gate of n-channel MOS column output load transistor 76b is coupled to a column_bias line BL 80. The sources of n-channel MOS column output load transistors 76r, 76g, and 76b are coupled together to ground.

Figure 2:
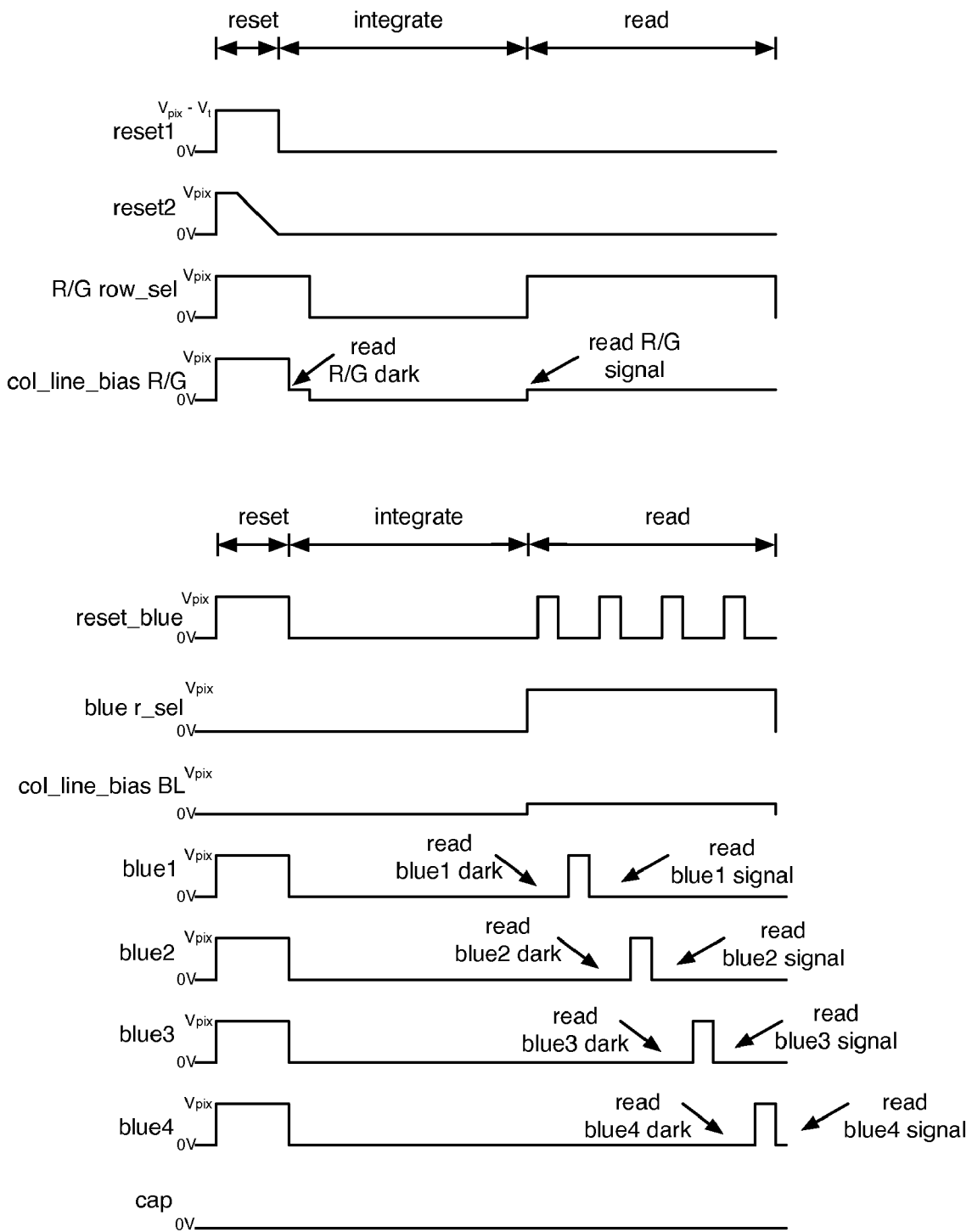
FIG. 2 is a timing diagram that illustrates one method for operating the pixel sensor of FIG. 1.

Referring now to FIG. 2, a timing diagram illustrates a method of operating the pixel sensor 10 of FIG. 1. First, the signal reset2 is asserted. Then the n-channel MOS column output load transistors 76r, 76g, and 76b are turned on. The red and green row-select signals are asserted. The reset1 line is biased to a voltage level just slightly higher than the $V_t$ of the p-channel MOS amplifier transistors 24r and 24g to just barely turn them on. At this point in time, transistor pairs 16r and 84r and 16g and 24g each form an amplifier. The reset2 signal is ramped down and negative feedback through capacitors 32r and 32g act to cancel any reset noise in the amplifiers.

Next, photocharge is integrated on the red, green, and blue photodiodes. The signal reset1 is turned on hard to place the potential $V_{pix}$ at the drains of transistors 16r and 16g to cause them to operate as source-follower amplifiers. The red, green, and blue row select transistors are turned on and the red, green and blue bias transistors are tuned on as current source loads.

According to one aspect of the present invention, depicted in FIG. 2, the four blue signals are read out individually. The blue row select transistor is turned on and the blue column line bias transistor is turned on to provide a bias level and the blue1, blue2, blue3, and blue4 signals are individually asserted. The reset_blue signal is asserted in between each of the blue1, blue2, blue3, and blue4 signals in order to clear the previous signal from the common node.

As shown in FIG. 2, the red and green channels may also be read prior to the start of photointegration to generate a red dark and a green dark signal. The red dark signal and the green dark signal may then be subtracted from the red and green signals that are read after photo integration in order to cancel any effects due to the variation in the reset levels of the red and green channels.

Figure 3:
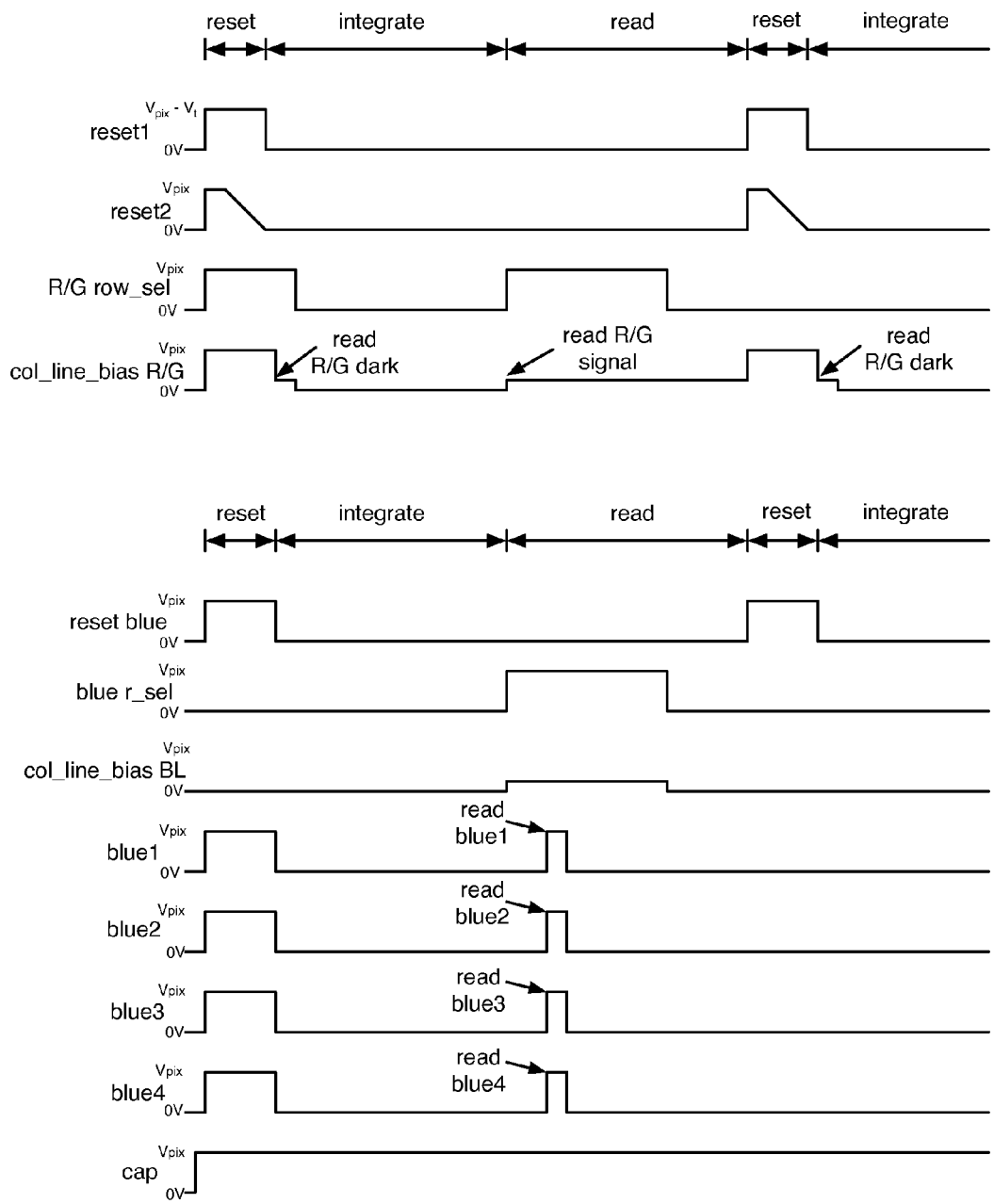
FIG. 3 is a timing diagram that illustrates another method for operating the pixel sensor of FIG. 1.

According to another aspect of the present invention depicted in FIG. 3, the pixel sensor is operated in a mode in which the four blue signals are read out simultaneously. In this mode, the signal "cap" is asserted on line 74 to add the capacitance of MOS capacitor 70 to the capacitance of sense node 42 in order to prevent the combined blue signals from overwhelming the capacitance of the blue sense node 42. As shown in FIG. 3, "dark" readings may also be taken in the red and green channels to compensate for the variation in the reset levels of the red and green channels.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A CMOS active pixel sensor comprising:
   a red photodiode coupled to a red sense node;
   a green photodiode coupled to a green sense node;
   a plurality of blue photodiodes, each blue photodiode coupled to a blue sense node through a different n-channel MOS blue-select transistor having a gate coupled to a different blue select line;
   an n-channel MOS blue reset transistor having a drain coupled to a supply node, a source coupled to the blue sense node, and a gate coupled to a reset control line;
   an n-channel MOS source-follower transistor having a gate coupled to the blue sense node, a drain coupled to a source-follower supply node, and a source;
   a blue row-select transistor having a drain coupled to the source of the source-follower transistor, a source coupled to a blue column output line and a gate coupled to a blue row-select line;
   an n-channel MOS red amplifier transistor having a gate coupled to the red sense node, a drain coupled to a supply node, and a source;
   an n-channel MOS red reset transistor having a drain coupled to the drain of the n-channel MOS red amplifier transistor, a source coupled to the red sense node, and a gate coupled to a reset2 control line;
   a red feedback capacitor coupled between the red sense node and the drain of the n-channel MOS red reset transistor;
   a red row-select transistor having a drain coupled to the source of the n-channel MOS red amplifier transistor, a source coupled to a red column output line and a gate coupled to a red-green row-select line;
   an n-channel MOS green amplifier transistor having a gate coupled to the green sense node, a drain coupled to a supply node, and a source;
   an n-channel MOS green reset transistor having a drain coupled to the drain of the n-channel MOS green amplifier transistor, a source coupled to the green sense node, and a gate coupled to the reset2 control line;

a green feedback capacitor coupled between the green sense node and the drain of the n-channel MOS green reset transistor; and a green row-select transistor having a drain coupled to the source of the n-channel MOS green amplifier transistor, a source coupled to a green column output line and a gate coupled to the red-green row-select line.

2. The CMOS active pixel sensor of claim 1 further including a MOS capacitor coupled to the blue sense node through a capacitor-select transistor having a gate coupled to a capacitor select line.

3. The CMOS active pixel sensor of claim 1 further including:

a p-channel MOS red amplifier transistor having a source coupled to a voltage-supply node, a drain coupled to the drain of the n-channel MOS red amplifier transistor, and a gate coupled to a red reset1 control line; and a p-channel MOS green amplifier transistor having a source coupled to a voltage-supply node, a drain coupled to the drain of the n-channel MOS green amplifier transistor, and a gate coupled to a green reset1 control line.

4. The CMOS active pixel sensor of claim 3 wherein the red reset1 control line and the green reset1 control line are common.

5. The CMOS active pixel sensor of claim 1 wherein the blue, red, and green column output lines each coupled, respectively, to a blue, red, and green column-line bias transistor, the gate of the blue column-line bias transistor coupled to a blue column line bias control line, and the gates of the red and green column-line bias transistor coupled to a R/G column line bias control line.

6. A CMOS active pixel sensor comprising:

a red photodiode coupled to a red sense node;

a green photodiode coupled to a green sense node;

a plurality of blue photodiodes, each blue photodiode coupled to a blue sense node through a different n-channel MOS blue-select transistor having a gate coupled to a different blue select line;

an n-channel MOS blue reset transistor having a drain coupled to a supply node, a source coupled to the blue sense node, and a gate coupled to a reset control line;

an n-channel MOS source-follower transistor having a gate coupled to the blue sense node, a drain coupled to a source-follower supply node, and a source;

a blue row-select transistor having a drain coupled to the source of the source-follower transistor, a source coupled to a blue column output line and a gate coupled to a blue row-select line;

an n-channel MOS red amplifier transistor configured to cancel reset noise during a reset period and to act as a source-follower during a readout period;

a red row-select transistor having a drain coupled to the source of the n-channel MOS red amplifier transistor, a source coupled to a red column output line and a gate coupled to a red-green row-select line;

an n-channel MOS green amplifier configured to cancel reset noise during a reset period and to act as a source-follower during a readout period; and a green row-select transistor having a drain coupled to the source of the n-channel MOS green amplifier transistor, a source coupled to a green column output line and a gate coupled to the red-green row-select line.

7. The CMOS active pixel sensor of claim 6 wherein the blue, red, and green column output lines each coupled, respectively, to a blue, red, and green column-line bias transistor, the gate of the blue column-line bias transistor coupled to a blue column line bias control line, and the gates of the red and green column-line bias transistor coupled to a R/G column line bias control line.

* * * * *